United States Patent [19]

Lucas

[11] Patent Number: 5,213,899

[45] Date of Patent: May 25, 1993

[54] ROOM TEMPERATURE VULCANIZABLE SILICONE COMPOSITIONS

[75] Inventor: Gary M. Lucas, Scotia, N.Y.

[73] Assignee: General Electric Company, Waterford, N.Y.

[21] Appl. No.: 628,308

[22] Filed: Dec. 17, 1990

[51] Int. Cl.$^5$ .............................................. B32B 9/04
[52] U.S. Cl. ..................................... 428/447; 528/18; 524/730; 524/859; 524/860; 524/863; 523/212; 428/412
[58] Field of Search .................. 528/18; 524/730, 859, 524/860, 863; 523/212; 428/447, 412

[56] References Cited

U.S. PATENT DOCUMENTS

| | | | |
|---|---|---|---|
| 4,395,526 | 7/1983 | White et al. | 528/18 |
| 4,417,042 | 11/1983 | Dziark | 528/18 |
| 4,467,063 | 8/1984 | Lockhart | 524/106 |
| 4,472,551 | 9/1984 | White et al. | 524/728 |
| 4,477,625 | 10/1984 | Lockhart | 524/789 |
| 4,483,973 | 11/1984 | Lucas et al. | 528/21 |
| 4,499,229 | 2/1985 | Lockhart | 524/450 |
| 4,499,230 | 2/1985 | Lockhart | 524/450 |
| 4,515,932 | 5/1985 | Chung | 528/16 |
| 4,517,337 | 5/1985 | Lockhart et al. | 528/18 |
| 4,528,353 | 7/1985 | Lucas et al. | 528/21 |
| 4,895,918 | 1/1990 | Lucas | 528/18 |

*Primary Examiner*—Melvyn I. Marquis

[57] ABSTRACT

Room temperature vulcanizable, scavenger-reduced, organopolysiloxane compositions having improved application rate amd thixotropy properties are provided, comprising a mixture comprising (A) the reaction product of a polyalkoxy-terminated organopolysiloxane, silica filler, and a cyano-functional polyalkoxy silane; (B) a tin condensation catalyst; and (C) a scavenger for hydroxy groups. In preferred embodiments, the RTV composition further comprises a crosslinking polyalkoxy silane and an adhesion promoting polyalkoxysilane.

28 Claims, 1 Drawing Sheet

ROOM TEMPERATURE VULCANIZABLE SILICONE COMPOSITIONS

BACKGROUND OF THE INVENTION

The present invention relates to one-component room temperature vulcanizable silicone rubber compositions. More particularly, the present invention relates to a method for improving the application rate and thixotropy properties of one-component room temperature vulcanizable silicone rubber compositions.

Room temperature vulcanizable (RTV) silicone rubber compositions combining the properties of high application rate (i.e., easy to extrude and pump) and good thixotropy (i.e., non-sagging in vertical joints) have a significant advantage in the marketplace. It is therefore desirable to provide a one-component RTV silicone rubber composition having both high application rate and good thixotropy properties.

The present invention is based on the discovery that the use of cyano-functional alkoxy silanes as an in situ treating agent for silica filler in certain alkoxy curing RTV silicone compositions will result in the subsequent sealant composition having a higher application rate and improved thixotropy.

It has been found that the application rate of a one component RTV sealant composition is adversely affected by the presence of excessive amounts of isolated silanol on the surface of silica filler used in making the RTV silicone composition. The presence of the silanol tends to result in silanol-silanol and silanol-methoxy condensation reactions which lower subsequent sealant application rate.

The present invention is based on the discovery that cyano-functional alkoxy silanes will react in situ with the isolated filler silanols to silylate and cap the silica surface, thereby eliminating the undesirable filler-filler and filler-polymer interactions and resulting in sealants having higher application rates. At the same time, the polar N≡C— groups now present on the filler surface are available to form hydrogen bonding networks which enhance overall sealant thixotropy. This latter function of the cyano-functional alkoxy silanes is particularly important when low viscosity polyalkoxy-terminated polydiorganosiloxane polymers are used.

The use of scavenger compounds in RTV silicone rubber compositions to react with excess hydroxy groups whether from methanol, silanol, or water is known in the art. Reference is made, for example, to U.S. Pat. No. 4,395,526 to White et al. (White); U.S. Pat. No. 4,483,973 and U.S. Pat. No. 4,528,353, both to Lucas et al. (Lucas); and U.S. Pat. No. 4,417,042 (Dziark). The scavengers disclosed in the White and Lucas patents are amine functional alkoxysilane compounds while those disclosed in the Dziark patent are silicone-nitrogen compounds. Although the scavenger compounds disclosed in these references are effective in removing the unwanted silanol groups form the surface of the filler, they do not appear to have an effect on the thixotropy properties of the sealant.

The use of cyano-functional polyalkoxy silanes in one part, alkoxy curing RTV silicone compositions is known in the art. Reference is made, for example, to U.S. Pat. Nos. 4,483,973 and 4,528,353, both to Lucas et al. (Lucas); and to U.S. Pat. No. 4,472,551 to White et al. (White). In the compositions disclosed in the Lucas patents, the cyano-functional polyalkoxy silane is used as a self-bonding, i.e., adhesion promoting, agent. In these compositions, excess hydroxy groups on the filler are removed by an amine functional alkoxysilane scavenger compound and not by the adhesion promoting cyano-functional polyalkoxy silane.

The White patent discloses that a preferred procedure for making the RTV composition therein is to agitate under substantially anhydrous conditions a mixture of a polyalkoxy-terminated organopolysiloxane, filler, and an amount of a polyalkoxysilane sufficient to effect the substantial elimination of hydroxy functional groups in the mixture. Thereafter, the condensation catalyst, crosslinking silane and other ingredients can be added. The White patent discloses the use of an organic scavenger for hydroxy groups.

SUMMARY OF THE INVENTION

It is a primary object of the present invention to provide improved one-component, RTV silicone compositions having higher application rates and improved thixotropy properties.

It is another object of the present invention to provide rheology enhancing additives which impart higher application rates and improved thixotropy properties to one-component, RTV silicone compositions.

It is still another object of the present invention to provide a method for providing one-component, RTV silicone compositions having improved application rate and thixotropy properties.

These objects and others are achieved in the present invention.

The present invention provides a shelf stable, one-component room temperature vulcanizable organopolysiloxane composition having improved application rate and thixotropic properties, comprising:

(A) the product obtained by agitating at a temperature of greater than 50° C., a mixture comprising by weight:

(1) 100 parts of a polydiorganosiloxane having a viscosity of from about 100 to about 1,000,000 centipoise at 25° C., wherein the silicon atoms at each polymer chain end is terminated with at least two alkoxy radicals, the organic group being a $C_{1-15}$ monovalent hydrocarbon radical, the polydiorganosiloxane having been prepared by a method comprising (a) agitating under substantially anhydrous conditions at a temperature in the range of from 0° C. to 180° C., a room temperature vulcanizable material comprising a mixture of (i) 100 parts of a silanol-terminated polydiorganosiloxane consisting essentially of chemically combined units of the formula (ii) an effective amount of a cross-linking agent and (iii) an effective amount of end-capping catalyst comprising a combination of a Lewis acid and a compound selected from the group consisting of substituted guanidines, amines and mixtures thereof, where R is selected from $C_{(1-13)}$ monovalent substituted or unsubstituted hydrocarbon radicals, the mixture of (i), (ii) and (iii) being agitated for a time sufficient to effect endcoupling of the silanol-terminated polydiorganosiloxane; and (b) contacting the mixture of step (a) with (iv) an effective amount of a silazane scavenger for hydroxy groups;

(2) from about 5 to about 40 parts of a reinforcing filler; and (3) from about 0.1 to about 3 parts of a cyano-functional polyalkoxy silane having the formula:

wherein each $R^3$ and $R^4$ is independently a monovalent hydrocarbon or substituted hydrocarbon radicals having from 1 to about 18 carbon atoms, "a" is a number ranging from about 0 to about 2, and Z is a saturated, unsaturated or aromatic cyano-functionalized hydrocarbon radical, the mixture comprising (A)(1), (A)(2), and (A)(3) being agitated for a period of time sufficient to effect silyation of hydroxy groups on the filler;

(B) an effective amount of a tin condensation catalyst;

(C) from about 0.1 to about 10.0 parts of a scavenger compound for hydroxy functional groups;

(D) from about 0 to about 2 parts of an adhesion promoter having the general formula:

wherein R and $R^1$ are $C_{(1-8)}$ monovalent hydrocarbon radicals, a is a number ranging from 0 to 3, and X is a saturated, unsaturated, or aromatic hydrocarbon which can be further functionalized by a member selected from the class consisting of ether, epoxy, isocyanato, cyano, acryloxy, and acyloxy; and (E) from about 0 to about 5 parts of a polyalkoxy silane crosslinking agent.

BRIEF DESCRIPTION OF THE DRAWINGS

FIG. I illustrates the application rate of the amount of sealant extruded from a Semco Tube fitted with a ⅛ inch aperture nozzle in one minute at 90 psi.

FIG. II demonstrates the Boeing flow test procedure as a measure of sealant thixotropy.

DETAILED DESCRIPTION OF THE INVENTION

Figure 1:
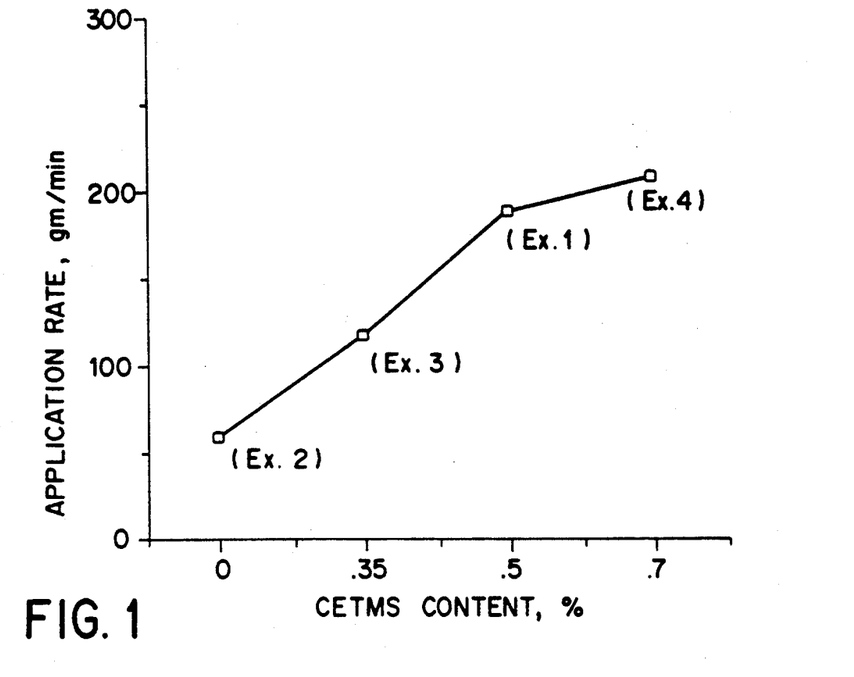
Figure 2:
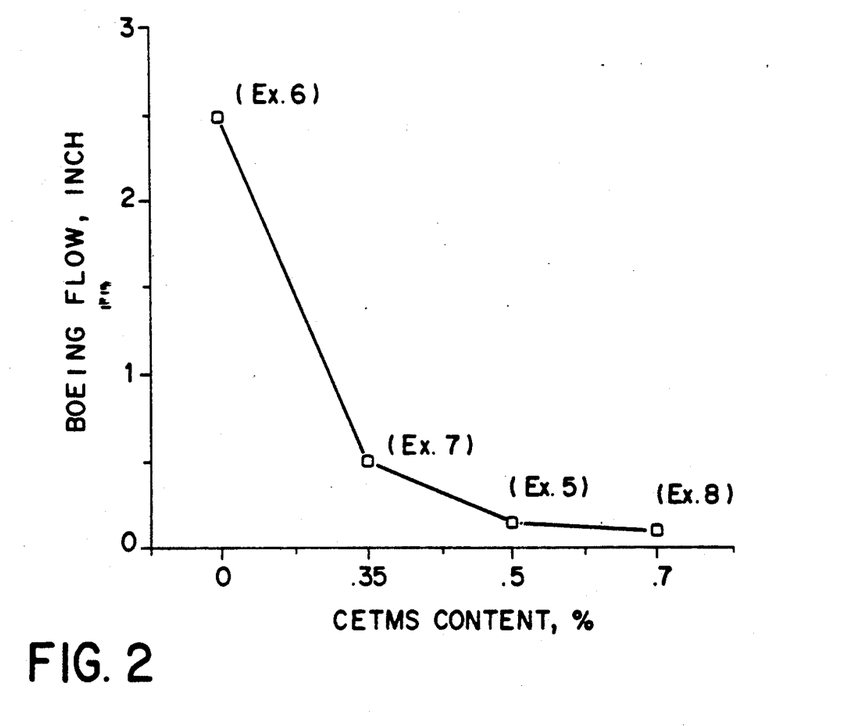

Component (A)(1) of the composition of the present invention is a diorganopolysiloxane polymer terminated at each end of the polymer chain by at least two alkoxy radicals and having a viscosity varying from about 100 to about 1,000,000 centipoise at 25° C. and preferably from about 5000 to about 200,000 centipoise at 25° C., the polydimethylsiloxane having been prepared by a method comprising (a) agitating under substantially anhydrous conditions at a temperature in the range of from 0° C. to 180° C., a room temperature vulcanizable material comprising a mixture of (i) 100 parts of a silanol-terminated polydiorganosiloxane consisting essentially of chemically combined units of the formula (ii) an effective amount of a cross-linking agent and (iii) an effective amount of end-capping catalyst comprising a combination of a Lewis acid and a compound selected from the group consisting of substituted guanidines, amines and mixtures thereof, where R is selected from $C_{1-13}$ monovalent substituted or unsubstituted hydrocarbon radicals, the mixture of (i), (ii) and (iii) being agitated for a time sufficient to effect endcoupling of the silanol-terminated polydiorganosiloxane; and (b) contacting the mixture of step (a) with (iv) an effective amount of a silazane scavenger for hydroxy groups.

The organic group of the polymer is a $C_{1-15}$ monovalent hydrocarbon radical.

Preferably, the polymer constituting component (A)(1) has the general formula: (I)

wherein each R and $R^2$ is independently a substituted or unsubstituted $C_{(1-15)}$ monovalent hydrocarbon radical, $R^1$ is a $C_{(1-8)}$ aliphatic organic radical selected from alkyl radicals, alkyl ether radicals, alkylester radicals, alkylketone radicals, alkylcyano radicals, or a $C_{(7-13)}$ aralkyl radical; "n" is a whole number ranging from about 50 to about 2500, and "a" is a whole number which is either 0 or 1.

In formula (I), R is preferably selected from $C_{(1-13)}$ monovalent hydrocarbon radicals halogenated hydrocarbon radicals, and cyano alkyl radicals; $R^1$ is preferably a $C_{(1-8)}$ alkyl radical or a $C_{(7-13)}$ aralkyl radical; and $R^2$ is preferably methyl, phenyl, or vinyl. Most preferably, R, $R^1$, and $R^2$ are each methyl.

The terminal silicon atom in the polymer of component (A)(1) must have at least two alkoxy groups and can have as many as three alkoxy groups in accordance with the above description.

The polymer of formula (I) is produced according to the method described in U.S. Pat. No. 4,515,932 to Chung, which is hereby incorporated by reference herein. In this method, the polymer is prepared by reacting a silanol terminated diorganopolysiloxane polymer having a viscosity in the range of 100 to 1,000,000 centipoise at 25° C. where the organic group is a monovalent hydrocarbon group with a polyalkoxy cross-linking agent of the formula in the presence of an end-coupling catalyst where $R^1$, $R^2$ and "a" are as previously defined.

The end-coupling reaction wherein the polymer of formula (III) is formed is carried out by mixing the alkoxy silane with the silanol terminated diorganopolysiloxane polymer or polymers in the presence of an end-coupling catalyst selected from the class consisting of Bronsted acids, Lewis acids, stearic acid treated calcium carbonate, and amines and mixtures thereof. The amines can be either primary, secondary, or tertiary amines. The more basic the amine the better it is as a catalyst. The most preferred catalyst is one of the acids indicated above and most preferably is a combination of one of the acids with an amine. After endcoupling is complete, a silazane (for example, hexamethyldisilazane) is added to quench the amine salt catalyst, providing a shelf stable polymer. For information as to such catalysts and the end-coupling reactions one is referred to the disclosure of Chung, U.S. Pat. No. 4,515,932, which was previously incorporated by reference herein.

It is critical to the present invention that the polymer of component (A) be prepared according to the method taught in the Chung reference cited and herein incorporated by reference herein because the presence of catalytic amounts of dissolved $NH_3$, which is a by-product of the hydrolysis of the silazane quencher), performs as a catalyst for the further hydrolysis of the cyano-functional polyalkoxysilane (component (A)(3) of formula (II) below and residual surface silanols on the fumed silica.

Component (A)(2) is a reinforcing filler, preferably fumed silica. Other fillers can be used in conjunction with the reinforcing filler. Examples of these other fillers include titanium dioxide, zirconium silicate, silica aerogel, iron oxide, diatomaceous earth, carbon black, precipitated silica, glass fibers, polyvinyl chloride, ground quartz, calcium carbonate, and the like.

The reinforcing filler is typically present in the compositions of this invention in an amount ranging from about 5 to about 40, preferably from about 10 to about 20, and most preferably from about 15 to about 20, parts per 100 parts of the polyalkoxy-terminated polydiorganosiloxane (A).

The amount of total filler (i.e., reinforcing filler and other types of filler) used can vary within wide limits in accordance with the intended use. For example, in some sealant applications, the curable compositions of the present invention can be used free of filler. In other applications, such as employment of the curable compositions for making binding material, as much as 700 parts or more of filler per 100 parts by weight of the polyalkoxy-terminated polydiorganosiloxane.

The compositions of the present invention also can be used as construction sealants and caulking compounds. The exact amount of filler therefore, will depend upon such factors as the application for which the composition is intended and the type of filler used.

It is frequently advantageous to pretreat a silica filler with an activating agent such as octamethylcyclotetrasiloxane.

Component (A)(3) is a cyano-functional polyalkoxy silane having the general formula: (III)

wherein each $R^3$ and $R^4$ is independently a monovalent hydrocarbon or substituted hydrocarbon radical having from 1 to about 18 carbon atoms, $R^5$ is a $C_{(2-12)}$ divalent hydrocarbon radical, and "t" is a number ranging from about 0 to about 3.

In the compound of formula (II), $R^3$ and $R^4$ can be alkyl radicals, e.g., methyl, ethyl, propyl, and the like; alkenyl radicals, e.g., vinyl, allyl, and the like; cycloalkyl radicals, e.g., cyclohexyl, cycloheptyl, and the like; mononuclear aryl radicals, e.g., methyl-phenyl and the like; and fluoroalkyl radicals, e.g., 3,3,3-trifluoropropyl. Preferably, $R^3$ and $R^4$ are preferably selected from methyl or ethyl, and most preferably are both methyl. $R^5$ is preferably an alkylene or arylene substituted or unsubstituted divalent hydrocarbon radical of 2-12 carbon atoms and more preferably from 2-8 carbon atoms.

A preferred specific compound within the scope of formula (II) above is gamma-cyanopropyltrimethoxysilane. Other specific compounds include
3-(cyanoethoxy)-3-methylbutenyltrimethoxysilane
beta-cyanoethylmethyldimethoxysilane
beta-cyanoethyltriethoxysilane
beta-cyanoethyltrimethoxysilane
2-cyanoethylmethyldiethoxysilane
3-cyanopropyltriethoxysilane
cyanopropylmethyldimethoxysilane
1-cyanoethyltris(methoxyethoxy)silane.

Methods for preparing the compounds within the scope of formula (II) are disclosed, for example, in U.S. Pat. Nos. 4,483,973 and 4,528,353, both to Lucas et al., which are both hereby incorporated by reference herein. These compounds can be prepared by reacting an olefinic cyanide with a trichlorohydride silane in the presence of a platinum catalyst to produce the desired intermediate and then alkoxylating this intermediate so as to produce the preferable gamma-cyanopropyltrimethoxysilane. Accordingly, one specific type of reaction could be, for instance, allyl cyanide reacted with trichlorosilane. In this reaction, the chlorosilane is reacted with the cyanide, otherwise, since the methoxy group will react with the cyanide group to lower the yield of the desired product if the methoxylated intermediate is used in the addition reaction with the platinum catalyst.

The preferred cyano-functional polyalkoxy silane for use as component (A)(3) in the composition of this invention is cyanoalkyltrialkoxysilane and most preferably cyanoethyltrimethoxysilane.

Component (A)(3) is present in the composition of this invention in an amount ranging from about 0.1 to about 3.0, preferably from about 0.2 to about 1.0, and most preferably from about 0.3 to about 0.8, parts by weight based on the weight of the total composition.

Component (B) is a tin condensation catalyst. The catalyst can be a diorganotin-bis-diketonate condensation catalyst of the general formula: (III)

wherein $R^6$ is selected from $C_{(1-18)}$ monovalent hydrocarbon radicals and substituted monovalent hydrocarbon radicals, and $R^7$, $R^8$, and $R^9$ are the same or different monovalent radicals selected from the class consisting of hydrogen, $R^6$, $OR^6$, $—Si(R^6)_3$, $—OSi(R^6)_3$, aryl, acyl, and nitrile.

Radicals included within $R^6$ of formula (III) are, for example, $C_{(6-13)}$ aryl radicals and halogenated aryl radicals, such as phenyl, tolyl, chlorophenyl, naphthyl; $C_{(1-18)}$ aliphatic, cycloaliphatic radicals, and halogenated derivatives thereof, for example, cyclohexyl, cyclobutyl; alkyl and alkenyl radicals, such as methyl, ethyl, propyl, chloropropyl, butyl, pentyl, hexyl, heptyl, octyl, vinyl, allyl, and trifluoropropyl.

Some of the tin condensation catalysts included within formula (III) are, for example:
Di(n-butyl)tinbis(acetylacetonate);

Di(n-butyl)tinbis(benzoylacetonate);
Di(ethyl)tinbis(lauroylacetonate);
Di(methyl)tinbis(pivaloylacetonate);
Di(n-octyl)tinbis(acetylacetonate);
Di(n-propyl)tinbis(1,1,1-trifluoroacetylacetonate);
Di(n-butyl)tinbis(ethylacetoacetate); and
Di(n-butyl)tin(acetylacetonate)(ethylacetoacetate).

The tin condensation catalyst can also be a diorganotin dicarboxylate such as, for example, dibutyltindilaurate, dibutyltindiacetate, dibutyltindimethoxide, dibutyltin dibenzoate, dimethyltin dibutyrate, and dimethyltin di-neodeconoate.

Other tin catalysts suitable for use in this invention include, for example, carbomethoxyphenyl tin tri-suberate, tin octoate, isobutyl tin triceroate, triethyl tin tartrate, tin oleate, tin naphthenate, butyltintri-2-ethylhexoate, and tin butyrate.

The preferred tin catalyst for use in the present invention is di(n-butyl)tinbis(acetylacetonate) or dibutyltindiacetate.

Effective amounts of the catalyst are generally from about 0.01 to about 2.0, preferably about 0.1 to about 1.0, and most preferably from about 0.2 to about 0.4, parts by weight.

Component (C) is a silicone scavenger compound for hydroxy-functional groups.

The scavenger can be any scavenger that is known in the art. A scavenger in this application is defined as any compound having a functional group that will tie up and react with free hydroxy groups in the composition and bond with the hydroxy groups and prevent them from reacting with alkoxy groups in the composition. In this respect, the scavenger can be an integrated crosslinker, scavenger as will be explained below which contains alkoxy groups as well as scavenging groups.

Suitable scavenger compounds for use in the RTV compositions of the present invention are disclosed, for example, in U.S. Pat. Nos. 4,895,918 (Lucas); 4,417,042 (Dziark); 4,467,063 (Lockhart); 4,477,625 (Lockhart); 4,499,229 (Lockhart); 4,499,230 (Lockhart); 4,395,526 (White et al.); and 4,472,551 (White et al.), all of which are incorporated by reference herein.

Suitable scavengers for use in this invention include, for example, non-cyclic silanol scavengers and cyclic silyl nitrogen scavengers, which are disclosed in U.S. Pat. No. 4,895,918 to Lucas, which was above incorporated by reference herein.

Another class of scavenging compounds that can be used as scavengers in the RTV compositions of this invention is a silane having the formula (IV)

$$(R^1O)_{4-(c+f)}-\underset{\underset{\displaystyle (R^2)_c}{|}}{Si}-(X)_f$$

wherein $R^1$ and $R^2$ are as previously defined, and X is a hydrolyzable leaving group selected from the group consisting of silazy, cyclic amido, amido, amino, carbamato, enoxy, imidato, isocyanato, oximato, thioisocyanato, and ureido radicals, and "c" is a whole number equal to 0 to 3 inclusive, "f" is an integer equal to 1 to 4 inclusive and the sum of c+f is equal to 1 to 4 inclusive.

Scavengers within the scope of formula (IV) are disclosed, for example, in U.S. Pat. Nos. 4,895,918 to Lucas and 4,395,526 to White et al., which were both previously incorporated by reference herein.

Also suitable for use in the present invention are the N-silyl-substituted imidazoles disclosed in U.S. Pat. Nos. 4,467,063 (Lockhart); the zeolites disclosed in 4,499,230 (Lockhart); and the organic scavengers taught in 4,472,551 (White et al), which were all previously incorporated by reference herein.

Other suitable scavengers include, for example, the silicon-containing scavengers disclosed in U.S. Pat. Nos. 4,499,229 and 4,477,625, both to Lockhart, which were both previously incorporated by reference herein.

These silicon-containing scavengers have the general formula $$\equiv Si-(X)_d$$

wherein X is as previously defined, d is a whole number equal to 0 to 4 inclusive, and the remaining valences of Si other than those which can be satisfied by X can be satisfied by atoms selected from Si, H, C, O, N, P, S, transition elements IIIa, IVa, Va, VIa, VIIa, and VIII and mixtures thereof.

The preferred scavenger for use in the RTV compositions of this invention is a silicon-nitrogen compound selected from the class consisting of:

(a) a silicone-nitrogen compound having the formula $$(Y)(R^{11})_2Si-\underset{\underset{\displaystyle R^{10}}{|}}{N}-Si(R^{11})_2Y$$

where Y is selected from $R^{11}$ and $(R^{10})_2N-$; and (b) A silicon-nitrogen polymer comprising (1) from 3 to 100 mole percent chemically combined structural units selected from the class consisting of units having the formulae and (2) from 0 to 97 mole percent chemically combined structural units represented by the formula $$(R^{11})_c SiO_{(4-c/2)}$$

where the silicon atoms of the silicon-nitrogen polymer are joined to each other by a member selected from a SiOSi linkage and a SiNR$^{10}$Si linkage, the free valences of the silicon atoms other than those joined to oxygen to form a siloxy unit and nitrogen to form a silazy unit are joined to a member selected from an $R^{11}$ radical and an $(R^{10})_2N$ radicals and where the ratio of the sum of the $R^9$ radicals and the $(R^{10})_2N$ radicals to the silicon atoms of the silicon-nitrogen polymer has a value of 1.5 to 3, inclusive, and $R^{10}$ is a member selected from the group consisting of hydrogen, monovalent hydrocarbon radicals, and fluoroalkyl radicals, $R^{11}$ is a member selected from the group consisting of hydrogen, monovalent hydrocarbon radicals, and fluoroalkyl radicals, and c is a whole number equal to 0 to 3, inclusive.

Examples of silicon-nitrogen compounds within the formulae above and suitable for use in the present invention are disclosed in U.S. Pat. No. 4,417,042 (Dziark), which was previously incorporated by reference herein. These compounds include the silazanes and hydrogen-containing amines.

The preferred silicon-nitrogen scavenger compounds for use in this invention are the disilazanes and the polysilazanes. Examples of suitable silazanes include hexamethylcyclotrisilazane, octamethyltetrasilazane, trimethyltriphenylcyclotrisilazane, and trivinyltrimethylcyclotrisilazane, and the like. The most preferred polysilazane for use in this invention is hexamethylcyclo-N-methyltrisilazane and the most preferred disilazane is hexamethyldisilazane.

The scavenger is present in the composition of this invention in an amount within the range of from about 0.1 to about 10, preferably about 0.5 to about 5.0, and most preferably from about 1.0 to about 2.0, parts per 100 parts of the polyalkoxy-terminated polydiorganosiloxane (A).

Examples of silicon-nitrogen compounds within the formulae above and suitable for use in the present invention are disclosed in U.S. Pat. No. 4,417,042 (Dziark), hereby incorporated by reference herein. These compounds include the silazanes and hydrogen-containing amines.

The preferred silicon-nitrogen scavenger compounds for use in this invention are the silazanes, such as the disilazanes and the polysilazanes. Examples of suitable silazanes include hexamethylcyclotrisilazane, octamethyltetrasilazane, trimethyltriphenylcyclotrisilazane, and trivinyltrimethylcyclotrisilazane, and the like. The most preferred silazane for use in this invention is hexamethyldisilazane.

Whether a scavenger should be in the compositions of this invention will depend on the tin condensation catalyst used. A scavenger is generally not needed if a diorganotin-bis-diketonate is used as the condensation catalyst. A scavenger must be present, however, if a diorganotin dicarboxylate is used as the catalyst.

When used, the scavenger is present in the composition of this invention in an amount within the range of from about 0.1 to about 10, preferably about 0.5 to about 5.0, and most preferably from about 1.0 to about 2, parts by weight.

The RTV composition may also further comprise an adhesion promoter (Component (D)) having the general formula: (V)

wherein $R^{12}$ and $R^{13}$ are $C_{1-8}$ monovalent hydrocarbon radicals, Z is a saturated, unsaturated or aromatic hydrocarbon residue which may be further functionalized by a member selected from the class consisting of ether, epoxy, isocyanato, cyano, acryloxy, and acyloxy; and "b" varies from 0 to 3.

Preferably, component (D) is an adhesion promoter having the general formula: (VI)

wherein $R^{12}$ and $R^{13}$ are $C_{1-8}$ monovalent hydrocarbon radicals, $R^{14}$ and $R^{15}$ are $C_{2-12}$ divalent hydrocarbon radicals, $R^{16}$ is selected from the group consisting of hydrogen and $C_{1-8}$ monovalent hydrocarbon radicals and b varies from 0 to 3.

Suitable adhesion promoters within the scope of formulas (V) and (VI) and methods for making them are disclosed in U.S. Pat. No. 4,483,973 (Lucas et al.), hereby incorporated by reference herein.

In formulas (V), $R^{14}$ and $R^{15}$ can be any divalent hydrocarbon radical such as alkylene, arylene, alkylenearylene radicals, and can be substituted or unsubstituted with various groups such as halogen groups, ether groups, ester groups, and other hydrocarbon groups. $R^{16}$ can be hydrogen or a monovalent hydrocarbon radical and is preferably hydrogen. Compounds within the scope of formula (VI) above include, for example, gamma-glycidoxypropylmethyldimethoxysilane, gamma-glycidoxypropyltriethoxysilane, gamma-glycidoxypropylmethyldiethoxysilane, and gamma-glycidoxyethyltrimethoxysilane, and epoxycyclohexylethyltrimethoxysilane, and epoxycyclohexylethyltrimethoxysilane. The most preferred compound within the scope of formula (VI) is gamma-glycidoxypropyltrimethoxysilane.

Compounds of formulas (V) and (VI) can be made by silicone producers as described in the literature or obtained from specialty chemical supply houses.

In one method for producing such compounds, an allyl glycidyl ether is reacted with trimethoxyhydridesilane in the presence of a platinum catalyst. This general reaction can be followed to produce other compounds coming within the scope of formula (V) above.

The adhesion promoter is present in the composition of this invention in an amount of from about 0.6 to about 5 parts, preferably from about 0.8 to about 1.6 parts, and most preferably from about 1.0 to about 1.6 parts, per 100 parts of the polyalkoxy-terminated polydiorganosiloxane (A). If the adhesion promoter is present at less than 0.6 parts, improved primerless adhesion will not be achieved.

The RTV composition of this invention may further contain (E) a polyalkoxy crosslinking agent of the general formula: (VII)

wherein $R^1$, $R^2$, and "a" are as defined previously herein.

Illustrative compounds represented by formula (VII) above include methyltrimethoxysilane, methyltriethoxysilane, ethyltrimethoxysilane, tetraethoxysilane, and vinyltrimethoxysilane. Methyltrimethoxysilane is preferred.

The crosslinking polyalkoxysilane can be present in the RTV compositions of this invention in an amount within the range of from about 0 to about 10, preferably from about 0.1 to about 2.0, and most preferably from about 0.5 to about 1.0, parts by weight per 100 parts of the polyalkoxy-functional polydiorganosiloxane (A).

The composition of the present invention may further contain from about 1 to about 50 parts by weight of a triorganosilyl endstopped diorganopolysiloxane (H) having a viscosity of from 10 to 5000 centipoise at 25° C., where the organo groups are monovalent hydrocarbon radicals, preferably of from 1 to 8 carbon atoms. Such linear diorganopolysiloxane polymers are useful as plasticizers. Preferably, such plasticizers are free of silanol groups but usually there is present up to about 500 ppm of silanol groups. It is also preferable that the organo substituent groups are methyl and that the viscosity range from 10 to 1000 centipoise at 25° C.

In place of, or in addition to, the foregoing plasticizer it is desirable to further include in the room temperature vulcanizable composition of the present invention from 1 to 20 parts by weight of a fluid siloxane containing a high degree of trifunctionality, tetrafunctionality or a mixture of tri and tetrafunctionality (MDT fluid). Generally, such plasticizers comprise (i) from 25 to 60 mole percent of monoalkylsiloxy units, siloxy units, or mixtures thereof, (ii) from 1 to 6 mole percent of trialkylsiloxy units and (iii) from 34 to 74 mole percent of dialkylsiloxy units, and wherein the plasticizer fluid contains from about 0.1 to about 2 percent by weight of silicon bonded hydroxyl units.

Other compounds, for example, flame retardants such as platinum, may also be included in the composition of the present invention.

The method used to prepare the RTV composition of this invention is critical. In particular, achievement of improved application rate and thixotropic sealant properties is dependent on the order of addition of the ingredients during manufacture. The shelf stable room temperature vulcanizable silicone composition of the present invention is prepared by a method comprising the steps of:

(I) agitating at a temperature of greater than 50° C. a mixture comprising by weight:

(A) (1) 100 parts of a polydiorganosiloxane having a viscosity of from about 100 to about 1,000,000 centipoise at 25° C., wherein the silicon atoms at each polymer chain end is terminated with at least two alkoxy radicals, the organic group being a $C_{1-15}$ monovalent hydrocarbon radical, the polydiorganosiloxane having been prepared by a method comprising (a) agitating under substantially anhydrous conditions at a temperature in the range of from 0° C. to 180° C., a room temperature vulcanizable material comprising a mixture of

(i) 100 parts of a silanol-terminated polydiorganosiloxane consisting essentially of chemically combined units of the formula $$-\underset{\underset{R}{|}}{\overset{\overset{R}{|}}{Si}}O-$$

(ii) an effective amount of a cross-linking agent and
(iii) an effective amount of end-capping catalyst comprising a combination of a Lewis acid and a compound selected from the group consisting of substituted guanidines, amines and mixtures thereof, where R is selected from $C_{(1-13)}$ monovalent substituted or unsubstituted hydrocarbon radicals, the mixture of (i), (ii) and (iii) being agitated for a time sufficient to effect endcoupling of the silanol-terminated polydiorganosiloxane; and (b) contacting the mixture of step (a) with (iv) an effective amount of a silazane scavenger for hydroxy groups; and (A) (2) from about 5 to about 20 parts of a reinforcing filler; and

(A) (3) from about 0.1 to about 3 parts of a cyanofunctional polyalkoxy silane having the formula:

wherein each $R^3$ and $R^4$ is independently a monovalent hydrocarbon or substituted hydrocarbon radical having from 1 to about 18 carbon atoms, $R^5$ is a $C_{(1-12)}$ divalent hydrocarbon radical, and "t" is a number ranging from about 0 to about 3, the mixture comprising (A)(1), (A)(2), and (A)(3) being agitated for a period of time sufficient to effect silyation of hydroxy groups on the filler, which is typically from about 1 to about 5 minutes;

(II) thoroughly mixing under anhydrous conditions the reaction product of step (I) with (B) an effective amount of a tin condensation catalyst;
(C) from about 0.1 to about 10.0 parts of a scavenger compound for hydroxy functional groups;
(D) from about 0 to about 2 parts of an adhesion promoter having the general formula:

wherein $R^{12}$ and $R^{13}$ are $C_{1-8}$ monovalent hydrocarbon radicals, Z is a saturated, unsaturated or aromatic hydrocarbon residue which may be further functionalized by a member selected from the class consisting of ether, epoxy, isocyanato, cyano, acryloxy, and acyloxy; and "b" varies from 0 to 3; and (E) from about 0 to about 5 parts of a crosslinking polyalkoxy silane.

The RTV compositions may be coated on a variety of substrates, particularly masonry substrates. Examples of suitable substrates include aluminum, glass, polyacrylate, polycarbonate, polyvinylchloride, and concrete.

The Examples given below are provided for the purpose of illustrating the present invention. They are not given for any purpose of setting limits or boundaries to the instant invention. All parts in the Examples are by weight.

EXPERIMENTAL

In the examples below, the term "CETMS" refers to 2-cyanoethyltrimethoxysilane. The term "$D_4$" refers to octamethylcyclotetrasiloxane.

EXAMPLE 1

Examples 1 describes the continuous preparation of CETMS-modified RTV compositions using a Werner-Pfleiderer twin screw extruder. This example illustrates the relationship between CETMS content and subsequent sealant extrusion rate.

All sections of the extruder were heated to 75° C. To barrel 1 of the extruder, there were continuously added 17 parts by weight of $D_4$ treated fumed silica filler, 60 parts by weight methyldimethoxy-terminated polydimethylsiloxane containing 0.5 parts by weight of hexamethyldisilazane and having a viscosity of 130,000 centipoise, and 0.75 parts by weight (i.e., 0.5 weight % in the sealant) of CETMS. To barrel 8 there were continuously added 40 parts by weight of methyldimethoxy-terminated polydimethylsiloxane having a viscosity of 130,000 centipoise, 17.5 parts by weight of dimethylpolysiloxane fluid having a viscosity of about 30,000 centistokes at 25° C., and 17.5 parts by weight of devolatilized MDT silanol-containing fluid having a viscosity of 50 centipoise at 25° C. A de-airing vacuum was applied at barrel 11. To barrel 12 there was continuously added 0.36 parts by weight of dibutyltindiacetate, 0.38 parts by weight of glycidoxypropyltrimethoxysilane, 0.75 parts by weight of 1,3,5-tris-trimethoxysilylpropylisocyuanate, 3 parts by weight of hexamethyldisilazane, and 1.05 parts by weight of methyltrimethoxysilane. RTV sealant was continuously produced at a rate of 40 pounds/hour.

EXAMPLES 2-4

The procedure followed in Example 1 was repeated in Examples 2-4 using 0%, 0.3%, and 0.7% CETMS, respectively. Application rates were determined by weighing the amount of sealant extruded from a Semco Tube fitted with a ⅛ inch aperture nozzle in 1 minute at 90 psi. The results are shown in FIG. I. Application rate values of less than 100 grams/minute are considered unacceptably low.

As can be seen in FIG. I, the application rate increases with higher amounts of CETMS.

EXAMPLES 5-8

Examples 1-4 were repeated except that the methyldimethoxy-terminated polydimethylsiloxane having a viscosity of 130,000 centipoise was replaced with a methyldimethoxy-terminated polydimethylsiloxane having a viscosity of 20,000 centipoise. Example 5 demonstrates the relationship between CETMS content and subsequent sealant thixotropy.

The Boeing Flow test procedure was used as a measure of sealant thixotropy. The results are shown in FIG. II. Flows of greater than 0.3 inch are considered unacceptably high.

As can be seen in FIG. II, the Boeing Flow decreases, indicating better thixotropy properties, with higher amounts of CETMS.

EXAMPLE 9

Example 9 describes the continuous preparation of a CETMS-modified RTV composition in which the CETMS is added as a silane blend in barrel 12 of a Werner-Pfleiderer extruder. This example demonstrates the criticality of how and where the CETMS is introduced into the Werner-Pfleiderer mixer.

Example 1 was repeated except that the CETMS was added (at 7 parts by weight) as a blend with dibutyltindiacetate, glycidoxypropyltrimethoxysilane, tristrimethoxysilylpropyl-(isocyanurate), hexamethyldisilazane, and methyltrimethoxysilane. Subsequent sealant rate was 95 grams/minute and Boeing Flow was 0.75 inch. This compares with an application rate of 220 grams/inch and Boeing Flow of 0.1 inch when the CETMS is independently added into barrel 1 of the extruder as in Examples 1-8 above and allowed to react in situ with the filler prior to the addition of the other ingredients.

Thus, the timing of the CETMS addition clearly has an effect on the application rate and thixotropic properties of the RTV composition.

What is claimed is:

1. A room temperature vulcanizable silicone composition having improved extrusion rate and thixotropic behavior, comprising by weight:
(A) the product obtained by agitating at a temperature of greater than 50° C., a mixture comprising by weight.
 (1) 100 parts of a polydiorganosiloxane having a viscosity of from about 100 to about 1,000,000 centipoise at 25° C., wherein the silicon atoms at each polymer chain end is terminated with at least two alkoxy radicals, the organic group being a $C_{1-15}$ monovalent hydrocarbon radical, the polydiorganosiloxane having been prepared by a method comprising (a) agitating under substantially anhydrous conditions at a temperature in the range of from 0° C. to 180° C., a mixture of
  (i) 100 parts of a silanol-terminated polydiorganosiloxane consisting essentially of chemically combined of the formula wherein R is a $C_{1-15}$ monovalent hydrocarbon radical
  (ii) an effective amount of a cross-linking agent of the formula wherein $R^2$ is a substituted or unsubstituted $C_{(1-15)}$ monovalent hydrocarbon radical, $R^1$ is a $C_{(1-8)}$ aliphatic organic radical selected from alkyl radicals, alkyl ether radicals, alkylester radicals, alkylketone radicals, alkylcyano radicals, or a $C_{(7-13)}$ aralkyl radical and "a" is a whole number which is either 0 or 1, and
  (iii) an effective amount of end-capping catalyst comprising a combination of a Lewis acid and a compound selected from the group consisting of substituted guanidines, amines and mixtures thereof, where R is selected from $C_{(1-13)}$ monovalent substituted or unsubstituted hydrocarbon radicals, the mixture of (i), (ii) and (iii) being agitated for a time sufficient to effect endcoupling of the silanol-terminated polydiorganosiloxane; and (b) contacting the mixture of step (a) with (iv) an effective amount of a silazane scavenger for hydroxy groups; and
 (2) from about 5 to about 40 parts of a silica reinforcing filler; and
 (3) from about 0.1 to about 3 parts of a cyano-functional polyalkoxy silane having the formula:

wherein each $R^3$ and $R^4$ is independently a monovalent hydrocarbon or substituted hydrocarbon radical having from 1 to about 18 carbon atoms, $R^5$ is a $C_{(2-12)}$ divalent hydrocarbon radical, and "t" is a number ranging from about 0 to about 3, the mixture comprising (A)(1), (A)(3)

being agitated for a period of time sufficient to effect silyation of hydroxy groups on the filler;

(B) an effective amount of a tin condensation catalyst;

(C) from about 0.1 to about 10.0 parts of a scavenger compound for hydroxy functional groups;

(D) from about 0 to about 2 parts of an adhesion promoter having the general formula:

wherein $R^{12}$ and $R^{13}$ are $C_{1-8}$ monovalent hydrocarbon radicals, Z is a saturated, unsaturated or aromatic hydrocarbon residue which may be further functionalized by a member selected from the class consisting of ether, epoxy, etherepoxy, isocyanato, cyano, acryloxy, and acyloxy, and "b" varies from 0 to 3; and (E) from about 0 to about 5 parts of a crosslinking polyalkoxy silane of the formula wherein $R^1$, $R^2$ and a are as previously defined.

2. A composition according to claim 1 wherein the polyalkoxy-terminated polydiorganosiloxane (A) has the general formula:

wherein each R and $R^2$ is independently a substituted or unsubstituted $C_{(1-15)}$ monovalent hydrocarbon radical, $R^1$ is a $C_{(1-8)}$ aliphatic organic radical selected from alkyl radicals, alkyl ether radicals, alkylester radicals, alkylketone radicals, alkylcyano radicals, or a $C_{(7-13)}$ aralkyl radical; "n" is a whole number ranging from about 50 to about 2500, and "a" is a whole number which is either 0 or 1.

3. A composition according to claim 1 wherein the reinforcing filler is fumed silica filler.

4. A composition according to claim 1 wherein the tin condensation catalyst is a diorganotin-bis-diketonate condensation catalyst of the general formula:

wherein $R^6$ is selected from $C_{(1-18)}$ monovalent hydrocarbon radicals or substituted monovalent hydrocarbon radicals, and $R^7$, $R^8$, and $R^9$ are the same or different monovalent radicals selected from the class consisting of hydrogen, $R^6$, $OR^6$, $-Si(R^6)_3$, $-OSi(R^6)_3$, aryl, acyl, and nitrile.

5. A composition according to claim 4 wherein the diorganotin-bis-diketonate is di(n-butyl)tinbis(acetylacetonate).

6. A composition according to claim 1 wherein the tin condensation catalyst is a diorganotin dicarboxylate.

7. A composition according to claim 6 wherein the diorganotin dicarboxylate is selected from the group consisting of dibutyltindilaurate, dibutyltindiacetate, dibutyltindimethoxide, dibutyltin dibenzoate, dimethyltin dibutyrate, dimethyltin di-neodeconoate, di(n-butyl)tinbis(ethylacetoacetate); and di(n-butyl)tin-(acetylacetonate)(ethylacetoacetate).

8. A composition according to claim 7 wherein the diorganotin dicarboxylate is dibutyltindilaurate.

9. A composition according to claim 1 wherein the tin condensation catalyst is a carbomethoxyphenyl tin trisuberate, tin octoate, isobutyl tin triceroate, triethyl tin tartrate, tin oleate, tin naphthenate, butyltintri-2-ethylhexoate, or tin butyrate.

10. A composition according to claim 1 wherein the cyano-functional polyalkoxy silane is cyanoalkyltrialkoxysilane.

11. A composition according to claim 10 wherein the cyanoalkyltrialkoxysilane is selected from the group consisting of beta-cyanoethylmethyldimethoxysilane; beta-cyanoethyltriethoxysilane; beta-cyanoethyltrimethoxysilane; 2-cyanoethylmethyldiethoxysilane; 3-cyanopropyltriethoxysilane; cyanopropylmethyldimethoxysilane; and 1-cyanoethyltris(methoxyethoxy)silane.

12. A composition according to claim 11 wherein the cyanoalkyltrialkoxysilane is beta-cyanoethyltrimethoxysilane.

13. A composition according to claim 1 wherein Z is an ether epoxy having the general formula:

wherein $R^{14}$ and $R^{15}$ are $C_{2-12}$ divalent hydrocarbon radicals, and $R^{16}$ is selected from the group consisting of hydrogen and $C_{1-8}$ monovalent hydrocarbon radicals.

14. A composition according to claim 13 wherein the epoxy-functional polyalkoxy silane is gamma-glycidoxypropyltrimethoxysilane.

15. A composition according to claim 1 wherein the polyalkoxy silane crosslinking agent is methyltrimethoxysilane.

16. A composition according to claim 1 wherein the cyano-functional polyalkoxy silane is present in an amount ranging from about 0.2 to about 1.0 part.

17. A composition according to claim 16 wherein the cyano-functional polyalkoxy silane is present in an amount ranging from about 0.3 to about 0.8 part.

18. A room temperature vulcanizable silicone composition having improved extrusion rate and thixotropic behavior, comprising by weight (A) the product obtained by agitating at a temperature of about 75° C. for about 30 minutes a mixture comprising by weight (1) 100 parts of a polydiorganosiloxane having a viscosity of from about 100 to about 1,000,000 centipoise at 25° C., wherein the silicon atoms at each polymer chain end is terminated with at least two alkoxy radicals, and having the general formula wherein each R, $R^1$ and $R^2$ are methyl groups; "n" is a whole number ranging from about 50 to about 2500, and "a" is a whole number which is either 0 or 1, the polydimethylsiloxane having been prepared by a method comprising (a) agitating under substantially anhydrous conditions at a temperature in the range of from 0° C. to 180° C., a room temperature vulcanizable material comprising a mixture of (ii) an effective amount of a cross-linking agent of the formula wherein $R^1$, $R^2$ and a are as previously defined and
(iii) an effective amount of end-capping catalyst comprising a combination of a Lewis acid and a compound selected from the group consisting of substituted guanidines, amines and mixtures thereof, the mixture of (i), (ii) and (iii) being agitated for a time sufficient to effect endcoupling of the silanol-terminated polydiorganosiloxane; and (b) contacting the mixture of step (a) with (iv) an effective amount of a silazane scavenger for hydroxy groups; and
(2) from about 15 to about 20 parts of fumed silica filler;
(3) from about 0.3 to about 0.8 part of beta-cyanoethyltrimethoxysilane;
(B) from about 0.2 parts to about 0.4 parts of dibutyltindiacetate;
(C) from about 1.0 to about 2.0 parts of hexamethyldisilazane;
(D) from about 1 to about 2 parts of gamma-glycidoxypropyltrimethoxysilane; and
(E) from about 0 to about 5 parts of methyltrimethoxysilane.

19. The cured composition of claim 1.
20. The cured composition of claim 18.
21. A substrate coated with the composition of claim 1.
22. A substrate according to claim 21 wherein the substrate is a masonry substrate.
23. A substrate according to claim 22 wherein the masonry substrate is an aluminum, glass, polyacrylate, polycarbonate, polyvinylchloride, or concrete substrate.
24. A substrate coated with the composition of claim 18.
25. A substrate according to claim 24 wherein the substrate is a masonry substrate.
26. A substrate according to claim 25 wherein the masonry substrate is an aluminum, glass, polyacrylate, polycarbonate, polyvinylchloride, or concrete substrate.
27. A method for preparing a shelf stable room temperature vulcanizable silicon composition having improved extrusion rate and thixotropic behavior, comprising the steps of:
(I) agitating at a temperature of greater than 50° C. mixture comprising by weight:
(A) (1) 100 parts of a polydiorganosiloxane having a viscosity of from about 100 to about 1,000,000 centipoise at 25° C., wherein the silicon atoms at each polymer chain end is terminated with at least two alkoxy radicals, the organic group being a $C_{1-15}$ monovalent hydrocarbon radical, the polydioganosiloxane having been prepared by a method comprising (a) agitating under substantially anhydrous conditions at a temperature in the range of from 0° C. to 180° C., a room temperature vulcanizable material comprising a mixture of
(i) 100 parts of a silanol-terminated polydiorganosiloxane consisting essentially of chemically combined units of the formula (ii) an effective amount of a cross-linking agent of the formula wherein $R^2$ is a substituted or unsubstituted $C_{(1-15)}$ monovalent hydrocarbon radical, $R^1$ is a $C_{(1-18)}$ aliphatic organic radical selected from alkyl radicals, alkyl ether radicals, alkylester radicals, alkylketone radicals, alkycyano radicals, or a $C_{(7-13)}$ aralky radical and "a" is a whole number which either 0 or 1, and
(iii) an effective amount of end-capping catalyst comprising a combination of a Lewis acid and a compound selected from the group consisting of substituted guanidines, amines and mixtures thereof, where R is selected from $C_{(1-13)}$ monovalent substituted or unsubstituted hydrocarbon radicals, the mixture of (i), (ii) and (iii) being agitated for a time sufficient to effect endcoupling of the silanol-terminated polydiorganosiloxane; and (b) contacting the mixture of step (a) with (iv) an effective amount of a silazane scavenger for hydroxy groups; and
(A) (2) from about 5 to about 40 parts of a silica reinforcing filler; and
(A) (3) from about 0.1 to about 3 parts of a cyanofunctional polyalkoxy silane having the formula:

wherein each $R^3$ and $R^4$ is independently a monovalent hydrocarbon or substituted hydrocarbon radical having from 1 to about 18 carbon atoms, $R^5$ is a $C_{(2-12)}$ divalent hydrocarbon radical, and "t" is a number ranging from about 0 to about 3, the mixture comprising (A)(1), (A)(2), and (A)(3) being agitated for a period of time sufficient to effect silyation of hydroxy groups on the filler;

(II) throughly mixing under anhydrous conditions the reaction product of step (I) with (B) an effective amount of a tin condensation catalyst;

(C) from about 0.1 to about 10.0 parts of a scavenger compound for hydroxy functional groups;

(D) from about 0 to about 2 parts of an adhesion promoter having the general formula:

wherein $R^{12}$ and $R^{13}$ are $C_{1-8}$ monovalent hydrocarbon radicals, Z is a saturated, unsaturated, or aromatic hydrocarbon residue which may be further functionalized by a member selected from the class consisting of ether, epoxy, etherepoxy, isocyanato, cyano, acryloxy, and acyloxy; and "b" varies from 0 to 3; and (E) from about 0 to about 5 parts of a cross linking polyalkoxy silane of the formula wherein $R^1$, $R^2$ and "a" are as previously defined.

28. A room temperature vulcanizable silicone composition having improved extrusion rate and thixotropic behavior, comprising by weight (A) the product obtained by agitating at a temperature of greater than 50° C., a mixture comprising by weight

(1) 100 parts of a polydiorganosiloxane having a viscosity of from about 100 to about 1,000,000 centipoise at 25° C., wherein the silicon atoms at each polymer chain end is terminated with at least two alkoxy radicals, the organic group being a $C_{1-15}$ monovalent hydrocarbon radical, the polydiorganosiloxane having been prepared by a method comprising (a) agitating under substantially anhydrous conditions at a temperature in the range of from 0° C. to 180° C., a mixture of (i) 100 parts of a silanol-terminated poly-diorganosiloxane consisting essentially of chemically combined units of the formula wherein R is a $C_{1-15}$ monovalent hydrocarbon radical, (ii) an effective amount of a cross-linking agent of the formula wherein $R^2$ is a substituted or unsubstituted $C_{1-15}$ monovalent hydrocarbon radical, $R^1$ is a $C_{1-18}$ aliphatic organic radical selected from alkyl radicals, alkyl ether radicals, alkylester radicals, alkylketone radicals, alkylcyano radicals, or a $C_{7-13}$ aralkyl radical and "a" is a whole number which is either 0 or 1, and (iii) an effective amount of end-capping catalyst comprising a combination of a Lewis acid and a compound selected from the group consisting of substituted guanidines, amines and mixtures thereof the mixture of (i), (ii) and (iii) being agitated for a time sufficient to effect endcoupling of the silanol-terminated polydiorganosiloxane; and (b) contacting the mixture of step (a) with (iv) an effective amount of a silazane scavenger for hydroxy groups; and

(2) from about 5 to about 40 parts of a silica reinforcing filler; and (3) from about 0.1 to about 3 parts of 3-(cyanoethoxy)-3-methylbutenyltrimethoxysilane;

(B) an effective amount of a tin condensation catalyst;

(C) from about 0.1 to about 10.0 parts of a scavenger compound for hydroxy functional groups;

(D) from about 0 to about 2 parts of an adhesion promoter having the general formula wherein $R^{12}$ and $R^{13}$ are $C_{1-8}$ monovalent hydrocarbon radicals, Z is a saturated, unsaturated or aromatic hydrocarbon residue which may be further functionalized by a member selected from the class consisting of ether, epoxy, etherepoxy, isocyanato, cyano, acryloxy, and acyloxy, and "b" varies from 0 to 3;

(E) from about 0 to about 5 parts of a cross-linking polyalkoxy silane of the formula wherein $R^1$, $R^2$ and a are as previously defined.

* * * * *